United States Patent [19]
Komori et al.

[11] Patent Number: 5,681,075
[45] Date of Patent: Oct. 28, 1997

[54] COWL LOUVER

[75] Inventors: Takahiro Komori; Takuji Nagata; Seiichi Asaka, all of Aich, Japan

[73] Assignee: Toyoda Gosei Co., Ltd., Aichi Pref., Japan

[21] Appl. No.: 406,343

[22] Filed: Mar. 17, 1995

[30] Foreign Application Priority Data

Mar. 17, 1994 [JP] Japan .................. 6-047329

[51] Int. Cl.$^6$ .................................................. B60H 1/28
[52] U.S. Cl. .................................. 296/192; 454/146
[58] Field of Search ..................... 296/192; 454/146, 454/147, 148, 275, 276

[56] References Cited

U.S. PATENT DOCUMENTS 5,277,656  1/1994  Koukal et al. .................... 454/147
5,312,295  5/1994  Young ............................. 454/275 X

FOREIGN PATENT DOCUMENTS 4-283171  10/1992  Japan .................. 296/192

*Primary Examiner*—Andrew C. Pike
*Attorney, Agent, or Firm*—Cushman Darby & Cushman IP Group of Pillsbury Madison & Sutro LLP

[57] ABSTRACT

A cowl louver for a vehicle permits fresh air to flow into an air intake and prevents entry of snow into the air intake. The cowl louver has a plate-like shaped base and includes at least one mesh portion, formed on the base, in which are formed a plurality of tapered air holes. Each tapered air hole is formed so that the direction of taper is directed inwardly with the larger opening facing to the exterior. Each tapered air hole has a rate of taper that is greater than about 0.1 per each mm of thickness of the mesh portion.

2 Claims, 4 Drawing Sheets

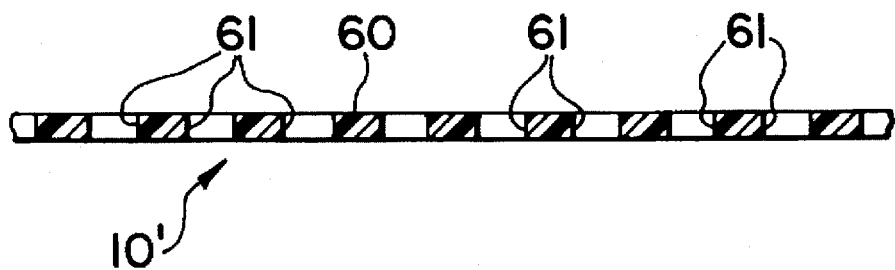
FIG. 3 *(PRIOR ART)*
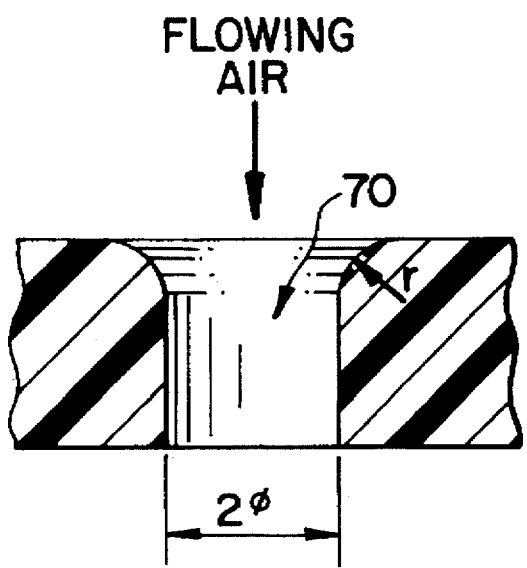
FIG. 4 *(PRIOR ART)*

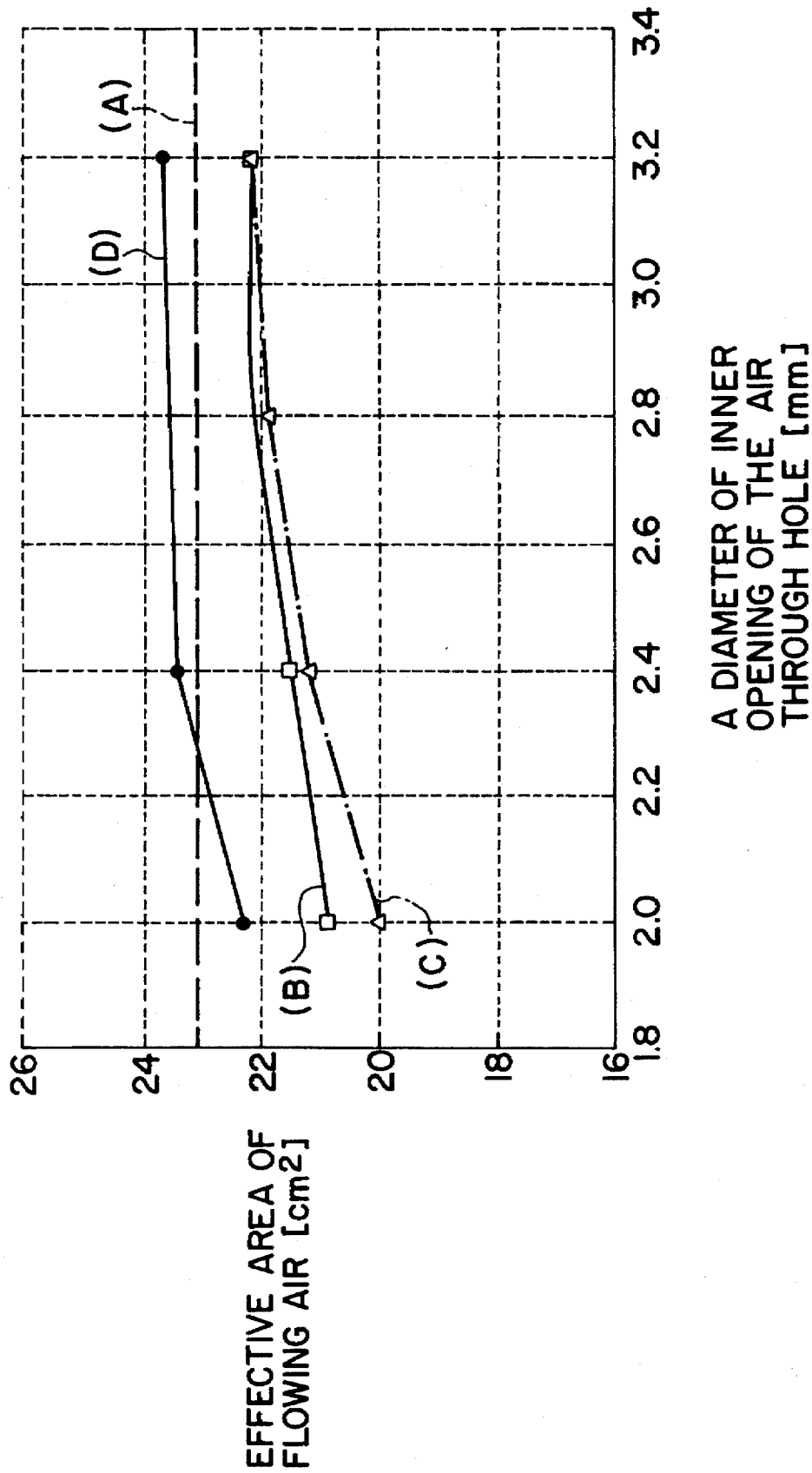

COWL LOUVER

BACKGROUND OF THE INVENTION

1. Field of the Invention

The present invention relates to a cowl louver for vehicles having taper-shaped air through holes, and more particularly a cowl louver suitable for vehicles in cold or chilly areas to readily allow fresh air into an air intake, and to prevent entry of snow, dead leaves, dust, or other similar debris into the air intake.

2. Description of Prior Art

A conventional cowl louver is mounted beneath a vehicle windshield as shown in FIG. 1. Such a conventional cowl louver is disclosed in Japanese Patent Laid open publication No. Hei 04-283171.

As shown in FIG. 1, a cowl louver 10 is placed over an inlet of an air intake opening and includes a base member 11 positioned beneath a windshield 2 of a vehicle 1. The cowl louver 10 allows fresh air into an air intake for the vehicle through the cowl portion 3 and through mesh type openings 12 that are positioned over openings formed in base 11. The cowl louver 10 is able to prevent entry of snow into the air intake when it is snowing.

FIG. 2 is an enlarged, partial cross-sectional view of the mesh type opening 12 taken along a line 20—20 in FIG. 1.

FIG. 3 is an enlarged, partial cross-sectional view showing another conventional cowl louver 10' looking in substantially the same direction as in FIG. 2.

In FIG. 3, the louver 10' is made of synthetic resin. Louver 10' includes a base 11, not shown in FIG. 3, but is partially visible in FIG. 1, which includes a perforated member 60 that contains a plurality of air through holes 61. Member 60 has a flat or plate-like shape, and is integrally formed, by injection molding, with base 11. Louver 10' is also located over the inlet of the vehicle air intake so that fresh air is introduced into the air intake through air through holes 61. The shape of each air through hole 61 is generally rectangular in plane view, preferably, for example, 1.5 mm by 2.0 mm, or 1.0 mm by 2.0 mm. Therefore, when the air through holes 61 are formed, a plurality of rectangular parallelepiped openings form a lattice type structure.

However, problems occur during molding since flow around square or rectangular members, in a mold, is difficult and the cowl louver 10' needs to have a predetermined thickness to maintain its shape and rigidity, especially member 60. Therefore, cowl louver 10' has an overall thickness, as a whole, that increases the required amount of molding material. The lattice-type structure also has a large width dimension so that during molding it is difficult to correctly form the air through holes in a restricted area which opposes the opening of the inlet of the vehicle air intake. Consequently, the holes formed are insufficient to ensure the desired volume of flow of fresh air.

If the air through holes become large enough to permit trouble-free molding, they will easily allow a good air flow but they will not prevent entry of snow or debris.

Also, as shown in FIG. 2, a member 50 includes a plurality of air through holes 51, similar to member 60 in FIG. 3. The member 50 also has a plate like shape and the shape of air through hole 51 is rectangular in plane view, such as holes 61 above. The base 11 and the member 50 are each made of synthetic resin.

However, in this case, member 50 is formed separately from base 11, which is not shown in FIG. 2 but is partially visible in FIG. 1. Therefore, base 11 can have a comparatively small thickness. But, this also creates molding problems in developing a proper flow of molding material through the mold during the forming of member 50. Thus, member 50 should have a predetermined thickness to maintain the shape and rigidity of the molded member 50. Then, the member 50 is fixed to the base 11, for example, by heat welding.

Further, member 50 can be covered with a decorative member 13 for producing a good appearance. The decorative member 13 is formed from crosspiece members 14 similar to a lattice or grille structure. Each crosspiece member 14 has a U-shaped cross section, and crosspiece members 14 are arranged at spaced apart predetermined intervals. The decorative member 13 is also fixed to base 11 by heat welding at the same time member 50 is joined. Therefore, air through openings 15 are formed between crosspiece members 14. Then, the size of each air through hole 51 of the member 50 is smaller than the size of each air through opening 15. Air through holes 51 also lie opposite openings 15. Therefore, fresh air is led through openings 15 of the decorative member 13 and then through holes 51 of the member 50.

In accordance with above conventional cowl louvers, fresh air is led into the air intake of the cowl portion 3 through air through holes 51 and 61 of each member 50 and 60, respectively. As the size of the air through holes 51, 61 are reduced, entry of snow will be prevented.

However, if the size of air through holes 51, 61 is reduced too much, it is enough to block entry of snow, but insufficient to allow entry of fresh air into the air intake.

On the other hand, if the size of air through holes 51, 61 is increased, it is possible to allow entry of fresh air into the air intake easily and will not prevent entry of snow.

It is difficult to form many rectangular parallelepiped air through holes in a conventional louver at a restricted area opposite an air inlet because it is necessary to produce sufficient rigidity around air through holes to prevent deformation. Members 50, 60 must have a thickness and width large enough to provide proper rigidity which reduces the number of rectangular parallelepiped air through holes that can be formed. Consequently, the effective area for flowing air is restricted and reduced.

One attempt to solve that problem was to use a fine mesh net made of stainless steel fixed to mesh type opening 12 instead of the members 50 and 60. Such a net had rigidity, so that a thickened base was not needed and the steel mesh was able to ensure a comparatively large effective air flow area and to prohibit entry of snow.

However, in use it is necessary to fix the fine steel net to the base which increases manufacturing cost and assembly steps.

FIG. 4 is an enlarged, partial cross-sectional view showing an air through hole, including the relationship between a radius or curved surface formed on an exterior or outer peripheral edge portion of the hole and the associated air flow resistance modulus, on which air flow tests were carried out.

FIG. 5 is a graph showing the relationship between that radius formed on the exterior or outer peripheral edge portion of the hole and the air resistance modulus, for the structure shown in FIG. 4.

With regard to FIGS. 4 and 5, hole 70 has a 2φ which equals a 2 mm diameter, and a 2 mm thickness. Hole 70 is cylindrical and formed on a synthetic resin plate with a peripheral edge on the exterior or inlet side of air through hole formed by a curved surface having a radius r mm.

Further, it should be understood that a change of the air resistance of the hole, related to a change of this radius r, is changing as the index function in FIG. 5. Therefore, it is effective to provide a curved surface on the exterior peripheral edge for reducing air resistance.

However, even by using a curved exterior about intake openings, a sufficient volume of fresh air flow cannot be achieved.

SUMMARY OF THE INVENTION

The present invention overcomes the conventional cowl louver problems described above.

An object of the present invention is to provide a cowl cover or louver having tapered holes, tapered from the exterior toward the interior, which allows fresh air to flow into an air intake. Such holes also prevent entry of snow into the air intake, have a simple constitution, and are easy to manufacture and inexpensive to manufacture.

Another object of the present invention is to provide a cowl louver which has a desirable air resistance modulus of the air through holes.

In accordance with the invention, these objects are achieved by a cowl louver having a base including a mesh portion, or mesh type opening, containing a plurality of tapered air through holes formed therein. Each tapered air through hole is formed with an interior opening dimension that is smaller than the exterior opening dimension, with the interior and exterior openings having a similar planar shape. It is preferred that each tapered hole has a rate of taper of about 0.1 per 1 mm of vertical length of the tapered hole.

Other objects, features, and characteristics of the present invention, as well as the methods and operation and functions of the related elements of the structure, will become apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

FIG. 3 is an enlarged, partial cross-sectional view of another conventional cowl louver;

FIG. 4 is an enlarged, partial cross-sectional view of an air through hole of a test structure;

FIG. 8 is a graph showing relationship between a diameter of inner opening of the air through hole and an effective area for flowing air.

DETAILED DESCRIPTION OF THE PRESENTLY PREFERRED EXEMPLARY EMBODIMENT

The preferred exemplary embodiment of the present invention will now be described with reference to the accompanying drawings.

Figure 1:
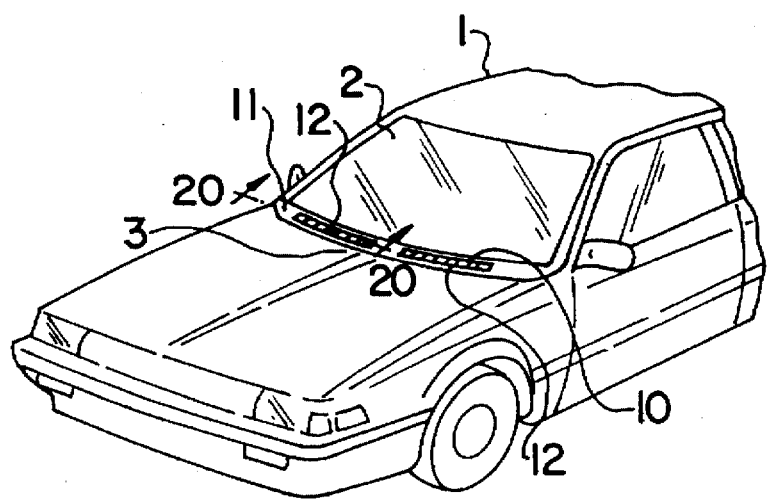
FIG. 1 is a perspective view of a cowl louver showing fixed on a vehicle.
Figure 2:
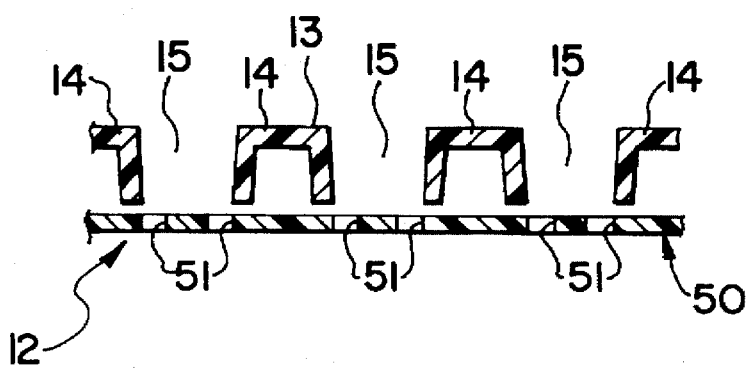
FIG. 2 is an enlarge, partial cross-sectional view showing mesh type opening of a conventional cowl louver taken along a line 20—20 in FIG. 1.
Figure 5:
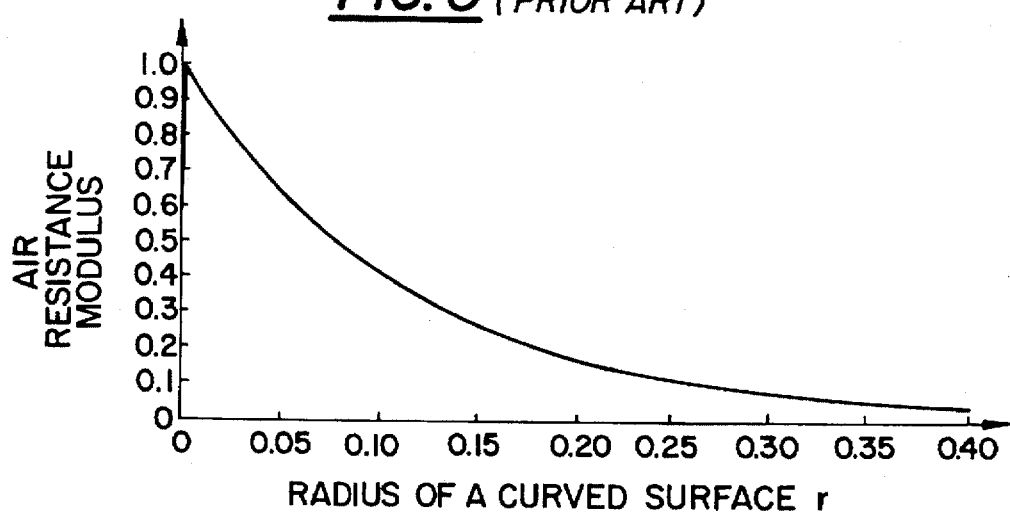
FIG. 5 is a graph showing relationship between a radius of a curved surface formed on an exterior or outer peripheral edge portion of the air through hole and the air resistance modulus.
Figure 6:
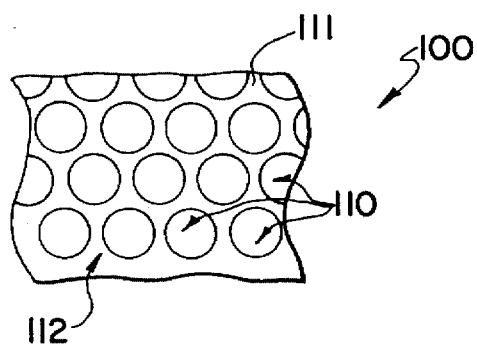
FIG. 6 is an enlarged, partial back view of a cowl louver of the present invention.
Figure 7:
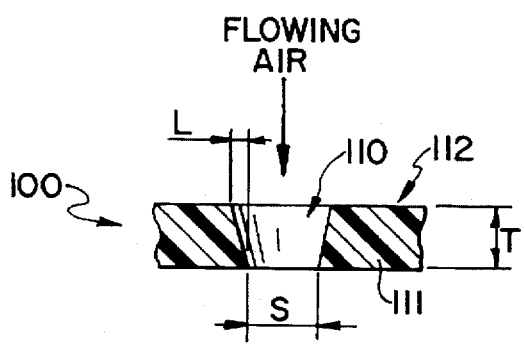
FIG. 7 is an enlarged, partial cross-sectional view of the cowl louver in FIG. 6.

As shown in FIGS. 6 and 7, a cowl louver 100 is placed over an inlet of an air intake of a cowl portion 3, beneath a windshield 2 of a vehicle 1, in a manner substantially the same as with the conventional cowl louver 10 shown in FIG. 1.

Cowl louver 100 is sized to allow entry of enough fresh air into the air intake of the cowl portion 3 through mesh portion 112 and prevents entry of snow into the air intake when snowing.

Cowl louver 100 has a base 111 which is formed with a plate-like shape, and a mesh or open portion 112 formed as part of base 111 for leading fresh air into the air intake.

Mesh portion 112 is comprised of a plurality of tapered air through holes 110. Mesh portion 112 is formed with a plate-like shape, and it is integrally formed with the base 111 by injection molding synthetic resin. Then, mesh portion 112 is placed over the inlet of the air intake. The dimensions of the structure forming the air through holes allows holes with a diameter of S mm to be created for the interior side of the tapered hole, which is round in plan view and a thickness of T mm. Thus, a rate of taper is represented by L/T which becomes about 0.1 per thickness T of 1 mm for base 111. Further, L relates to the diameter of the exterior opening and is (the diameter of exterior opening–the diameter of inner opening)/2. Therefore, the lengthwise shape of the tapered air through hole corresponds to the frustum of a cone, with a larger exterior or outer diameter and a smaller interior or inner diameter. Further, the number of air through holes is increased over those in a conventional cowl louver, and the distribution of the frustum shaped holes, in the present invention, provides better air flow than the conventional rectangular parallelepiped-shaped holes. Use of the frustum-shaped holes makes the inlet a round shape in plane view, to provide the largest effective area of flowing air in a restricted area, opposite the vehicle air intake, without associated problems of flowing molding material throughout a mold during formation of the molded cowl of the present invention.

Results of testing show that the size of S varies from 1.8 mm to 3.4 mm, T varies between 1.5 mm to 4.0 mm, and L can be between 0.15 mm to 1.0 mm. Thus, L/T varies from 0.1 to 0.5 in accordance with the mechanical strength of the hole.

FIG. 8 shows the air flow rate of a conventional fine mesh net (A) made of stainless steel. The plot identified by (B) shows an air flow rate of a comparative cylindrical air through hole provided with curved surface having a 0.3 mm radius at a peripheral edge of the outer side. The plot identified by (C) shows an air flow rate for a comparative cylindrical air through hole that does not include a curved peripheral edge surface, and (D) shows the plot for the air flow rate for the tapered frustum shaped air through hole of the present invention, where L is 0.3 mm. Each thickness T of (B), (C), and (D) is 2 mm, and each test structure used for (A) through (D) has a test area of 40 mm by 100 mm.

As shown in FIG. 8, it is understood that when the dimension for S is greater than 2.3 mm, the effective area of flowing air exceeds the air flow rate of (A), a conventional cowl design. However, when the size S of the hole is greater than 3.2 mm, that size will not prevent entry of snow.

Testing results demonstrate that S preferably varies from 2.3 mm to 3.2 mm, T is preferably between 2.0 mm to 3.0 mm, and L is preferably from 0.2 mm to 0.5 mm, with L/T preferably being 0.1 to 0.25. Also, a more preferred range for L is 0.3 mm to 0.5 mm in view of achieving desired material flow within the mold during molding and the desired rigidity of the final molded part.

While the shape of tapered air through hole in plane view is preferably circular, it could also be oval, polygonal, triangular, square, pentagonal, hexagonal, star-shaped, hexagram, or have a multilobed side wall shape.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A perforated cowl louver for use as an air inlet to an air system for a motor vehicle comprising:

a plate-like shaped base having a thickness T mm; and at least one mesh member integrally formed with said base;

said at least one mesh member having formed therein a plurality of truncated conically shaped through holes, each of said truncated conically shaped through holes having an exterior opening and an inner opening that is smaller in diameter than said exterior opening thereof so that the through holes taper toward an interior area, with each of said truncated conically shaped through holes also having a rate of taper of L/T that is greater than 0.1 per each mm of thickness where L equals (exterior opening diameter−inner opening diameter) /2.

2. A cowl louver as set forth in claim 1, wherein the diameter of each inner opening ranges between 2.3 mm to 3.2 mm, T varies between 2.0 mm to 3.0 mm, and L ranges from 0.3 mm to 0.5 mm.

\* \* \* \* \*